United States Patent
Pasquero et al.

(10) Patent No.: US 10,078,437 B2
(45) Date of Patent: Sep. 18, 2018

(54) METHOD AND APPARATUS FOR RESPONDING TO A NOTIFICATION VIA A CAPACITIVE PHYSICAL KEYBOARD

(71) Applicant: BlackBerry Limited, Waterloo (CA)

(72) Inventors: Jerome Pasquero, Montreal (CA); Donald Somerset McCulloch McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 404 days.

(21) Appl. No.: 13/771,187

(22) Filed: Feb. 20, 2013

(65) Prior Publication Data
US 2014/0232656 A1 Aug. 21, 2014

(51) Int. Cl.
*G06F 3/02* (2006.01)
*G06F 3/0487* (2013.01)

(52) U.S. Cl.
CPC .......... *G06F 3/0487* (2013.01); *G06F 3/0219* (2013.01)

(58) Field of Classification Search
CPC ................ G06F 3/04886; H04M 1/72522
See application file for complete search history.

(56) References Cited

U.S. PATENT DOCUMENTS

| | | | |
|---|---|---|---|
| 5,311,175 A | 5/1994 | Waldman | |
| 7,051,285 B1 * | 5/2006 | Harrison | G06F 3/0481 715/760 |
| 7,149,781 B2 | 12/2006 | Aoyama | |
| 2008/0042978 A1 * | 2/2008 | Perez-Noguera | G06F 3/0202 345/168 |
| 2008/0106519 A1 | 5/2008 | Murray | |
| 2008/0168379 A1 * | 7/2008 | Forstall et al. | 715/778 |
| 2009/0104928 A1 | 4/2009 | Alexandersson et al. | |
| 2009/0135142 A1 * | 5/2009 | Fu et al. | 345/168 |
| 2009/0177981 A1 * | 7/2009 | Christie et al. | 715/758 |
| 2010/0123676 A1 | 5/2010 | Kirkup | |
| 2010/0257447 A1 | 10/2010 | Kim et al. | |
| 2011/0004845 A1 | 6/2011 | Ciabarra | |
| 2011/0159469 A1 | 6/2011 | Hwang et al. | |
| 2011/0181538 A1 | 7/2011 | Aono | |
| 2012/0103776 A1 | 5/2012 | Walker et al. | |
| 2012/0198002 A1 * | 8/2012 | Goulart | H04L 51/36 709/206 |

(Continued)

FOREIGN PATENT DOCUMENTS

| | | |
|---|---|---|
| JP | 2006135809 A | 5/2006 |
| JP | 2008040552 A | 2/2008 |

OTHER PUBLICATIONS

BiteSMS—Great Extra Features"http://bitesms.com/main/more_features", Apr. 24, 2011.*

(Continued)

*Primary Examiner* — Matthew Yeung
(74) *Attorney, Agent, or Firm* — Fish & Richardson P.C.

(57) ABSTRACT

Methods and apparatuses are provided for multitasking with an electronic device. After operating the device in a first operational context, information is received providing the user the option to switch to operation in a second context. Responsive to user input indicating a control switch to the second context, the device may be operated in the second context. Additionally, the device can be reverted back to the first operational context after operation in the second context.

13 Claims, 3 Drawing Sheets

(56) References Cited

U.S. PATENT DOCUMENTS

2012/0299862 A1    11/2012  Matsumoto et al.

OTHER PUBLICATIONS

Extended European Search Report from the European Patent Office for corresponding EP Application No. 13155935.3, dated May 8, 2013 (8 pages).
Office Action from the European Patent Office for corresponding EP Application No. 13155935.3, dated Nov. 21, 2014 (5 pages).
Communication Pursuant to Article 94(3) EPC issued in European Application No. 13155935.3 dated Oct. 26, 2016.

* cited by examiner

METHOD AND APPARATUS FOR RESPONDING TO A NOTIFICATION VIA A CAPACITIVE PHYSICAL KEYBOARD

FIELD

This application generally relates to input methodologies for electronic devices, such as handheld electronic devices, and more particularly, to methods for controlling operation in two or more operational contexts using the features of a capacitive physical keyboard.

BACKGROUND

Increasingly, electronic devices, such as computers, netbooks, cellular phones, smart phones, personal digital assistants, tablets, etc., permit users to "multitask," that is, operating the devices in multiple contexts essentially simultaneously. Many users now demand and depend on these features as power functions. While the larger screen size, full-sized keyboard, and enhanced processing power of personal computers makes switching from task to task relatively simple, further development is needed for full integration of task switching in mobile devices.

Accordingly, methods and apparatuses are provided to enhance the ability of users to switch between two or more operational contexts in mobile devices.

DETAILED DESCRIPTION

Figure 1:
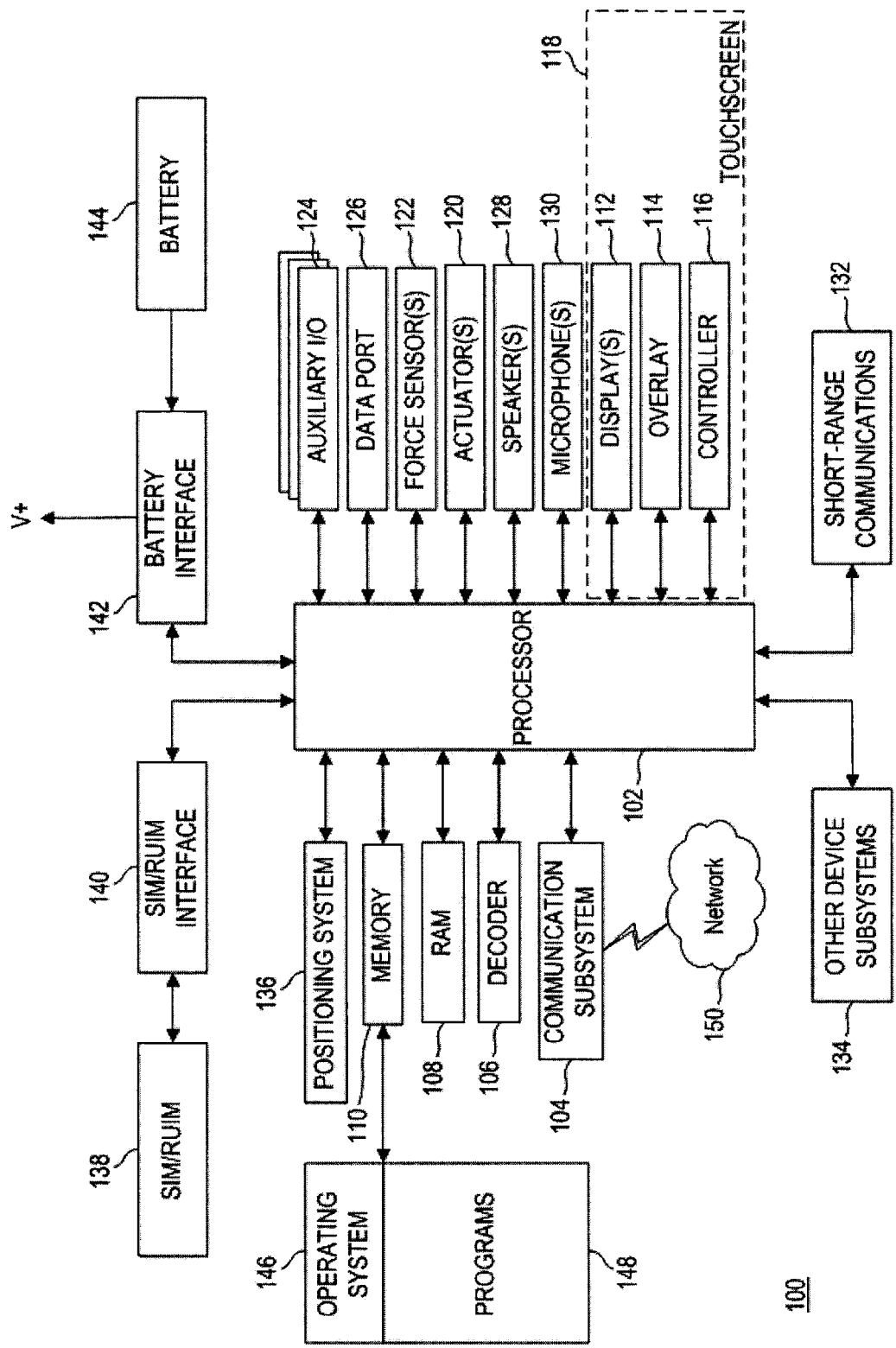
FIG. 1 is an example block diagram of an electronic device, consistent with embodiments disclosed herein.

Reference will now be made in detail to the disclosed example embodiments, examples of which are illustrated in the accompanying drawings. Wherever possible, the same reference numbers will be used throughout the drawings to refer to the same or like parts.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the," or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may be change) rather than any physical orientation of the host device.

In one embodiment, a method is disclosed for operating an electronic device having a display and a capacitive physical keyboard. The method includes controlling operation of the device in a first context in which a first input operation of the capacitive physical keyboard reflects selection of keys on the capacitive physical keyboard. Additionally, the method includes enabling, in response to receipt of information reflecting a potential context change, control of the device to switch to operation in a second context that is different from the first context. The method further includes controlling, in response to an input, operation in the second context in which a second input operation of the capacitive physical keyboard reflects selection of keys on the capacitive physical keyboard, wherein the second input operation is different from the first input operation. Further, the method includes returning control to operation in the first context.

In another embodiment, an electronic device having a display and a capacitive physical keyboard is disclosed. The device further comprises a memory containing instructions, and one or more processors configured to execute the instructions. The one or more processors are configured to execute the instructions to perform controlling operation of the device in a first context in which a first input operation of the capacitive physical keyboard reflects selection of keys on the capacitive physical keyboard. Additionally, the one or more processors are configured to perform enabling, in response to receipt of information reflecting a potential context change, control of the device to switch to operation in a second context that is different from the first context. The one or more processors are further configured to execute the instructions to perform controlling, in response to an input, operation in the second context in which a second input operation of the capacitive physical keyboard reflects selection of keys on the capacitive physical keyboard, wherein the second input operation is different from the first input operation. Further, the one or more processors are configured to execute the instructions to perform returning control to operation in the first context.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
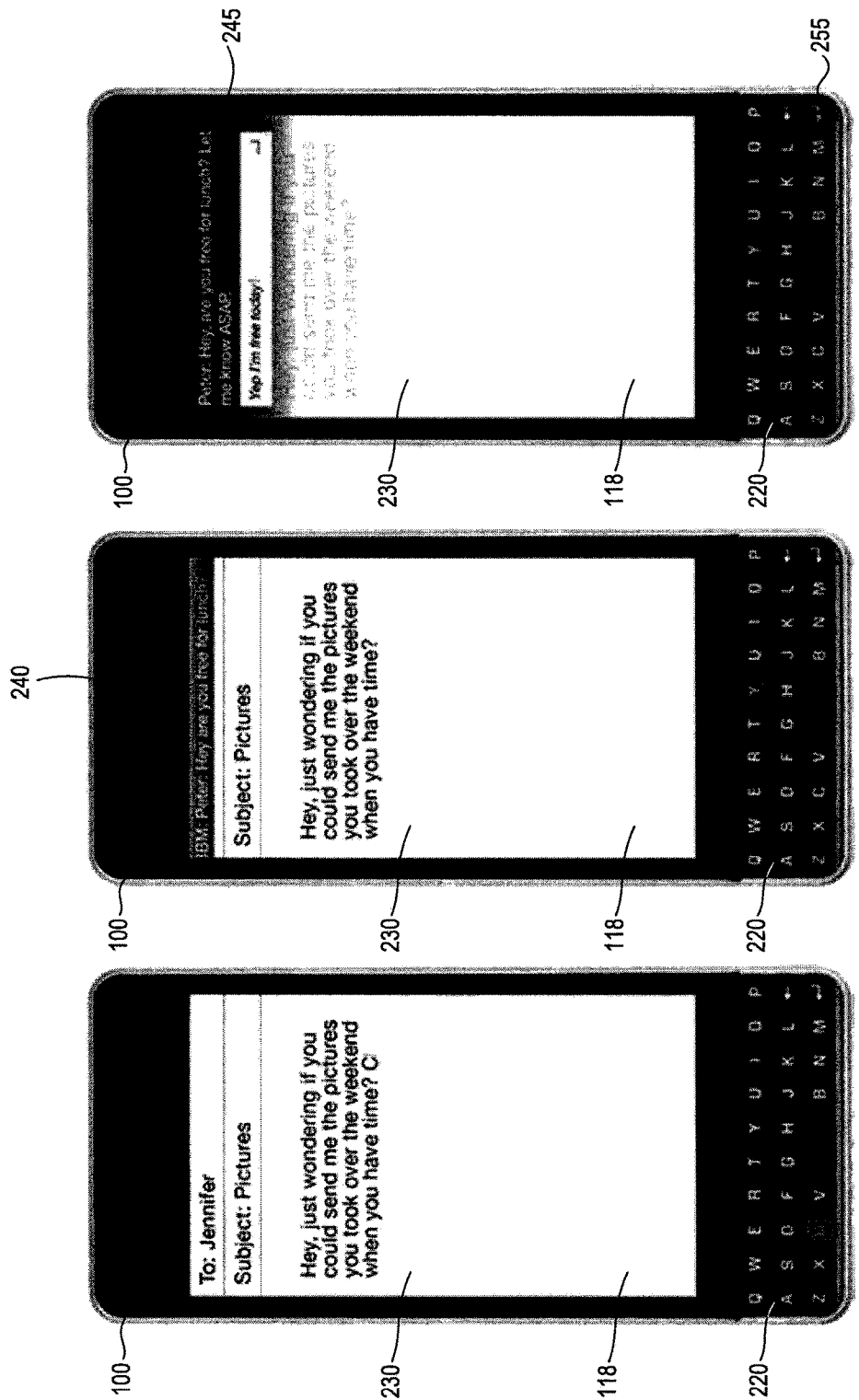
FIGS. 2A-2C show examples of an electronic device, consistent with embodiments disclosed herein.

FIGS. 2A-2C illustrate examples of electronic device 100, consistent with example embodiments disclosed herein.

Reference is first made to FIG. 2A, which illustrates a touchscreen 118 and a keyboard 220. In some embodiments, keyboard 220 is a capacitive physical keyboard, comprising a series of key covers overlaid on top of physical or electronic dome switches. Further, the capacitive physical keyboard contains actuators 120 and force sensors 122 that permit both tactile input via depression of the key covers on top of the actuators 120 and gesture input via force sensors 122. The input resolution of keyboard 220 is at least to the level of a single key; in other words, responsive to an input received via keyboard 220, processor 102 is capable of detecting which one of the plurality of keys of keyboard 220 was contacted. In some embodiments, an input received via keyboard 220 can be localized to precise coordinates in the X and Y directions on the keyboard via force sensors 122. Some embodiments may use other keyboard configurations such as a virtual keyboard and associated touchscreen interface.

As used herein, a "key press" input received by keyboard 220 means a depression of one of the plurality of keys associated with one of the actuators 120 for a duration exceeding 0.5 seconds that is sufficient to engage the physical or electronic dome switch associated with that key. In contrast, a "tap" input received by keyboard 220 means a touch input of one of the plurality of keys associated with one of the actuators 120 for a duration less than or equal to 0.5 seconds which does not engage the physical or electronic dome switch associated with that key. The input may be registered by one or more force sensors 122.

The position of the keyboard 220 is variable relative to touchscreen 118. The touchscreen 118 can be configured to detect the location and possibly pressure of one or more objects at the same time. The touchscreen 118 includes two input areas: (1) the keyboard 220 which includes a plurality of keys, each key corresponding to one or more different characters of a plurality of characters; and (2) a viewing pane 230 which displays a predetermined amount of text from a document under composition. In the example, the keyboard 220 is located below the viewing pane 230. Other locations for the input areas 220 and 230 are possible. For example, keyboard 220 could be located at the top of the touchscreen 118, and the viewing pane 230 could be located below the keyboard 220. In yet other examples, the viewing pane 230 could be omitted.

The amount of text in viewing pane 230 from a document under composition may be limited to a predetermined number of lines of text, for example, 10 lines. The document under composition may be any type of document for any application which supports the keyboard 220, such as an email or other messaging application.

As shown in FIG. 2A, keyboard 220 is a standard QWERTY keyboard layout; however, any conventional keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 220 includes various keys that can provide different inputs, such as punctuation, letters, numbers, enter or return keys, and function keys. While keyboard 220 is shown as having a square shape, it can have any other shape (such as an oval).

For purposes of this description, electronic device 100 is being operated in a first context. In the example of FIG. 2A, the first context concerns text input such as composing an email, instant message or other text message. In other embodiments, the first context may involve interacting with Internet Web pages over network 150. In still other embodiments, the first context may include interacting with programs 148, via operating system 146, such as software modules or mobile applications. Electronic device 100 receives text input through keyboard 220. In the illustrated example, the text is input as part of the first context by presses on the keys, i.e., depression of one of the plurality of key covers associated with actuators 120. In FIG. 2A, the press input is signified by the opaque circle on the "C" key of keyboard 220.

In FIG. 2B, device 100 receives a notification 240. Notification 240 may be associated with a second context of operation for electronic device 100. The second context may also concern a text input operation but a different text input operation from the first context. For example, in FIG. 2B notification 240 is associated with an instant message whereas, as explained, FIG. 2A involves composing an email message.

Notification 240 may be placed in various locations of touchscreen 118 and viewing pane 230. In the example of FIG. 2B, notification 240 is located at the top of touchscreen 118. Alternatively, notification 240 may be placed at the bottom of touchscreen 118, in the middle of touchscreen 118, or anywhere in viewing pane 230.

FIG. 2B also depicts the user opting to switch operation of electronic device 100 from the first context (composing an email) to the second context (responding to an instant message). Electronic device 100, via keyboard 220, receives a tap input, signified in FIG. 2B by the translucent circle on the "Y" key of keyboard 220. Consequently, a tap input on the force sensors 122 of the keyboard 220 is used to control electronic device 100 in the second context, as opposed to the pressing/actuating input which operated electronic device 100 in the first context.

In FIG. 2C, the user completes the response to the instant message comprising the second operational context. The graphical interface 245 associated with display 112 permits the second context to be on top and in focus during this process, while the first context remains open, but in the background. This permits rapid multitasking between the contexts. The user may complete operation in the second context by several methods. In one embodiment, the second context can be terminated by pressing a delimiting key to switch back to the first context, as illustrated by the tapping of the "Enter" key 255 in FIG. 2C. In an alternative embodiment, the second context is automatically terminated and operation returns to the first context after expiry of a timer associated with processor 102 of electronic device 100. In another alternative embodiment, the second context can be terminated by entering input associated with the first context. For example, if electronic device 100 is configured to receive key press inputs associated with the first context and tap inputs associated with the second context, the second context may be terminated by a key press input via keyboard 220.

Figure 3:
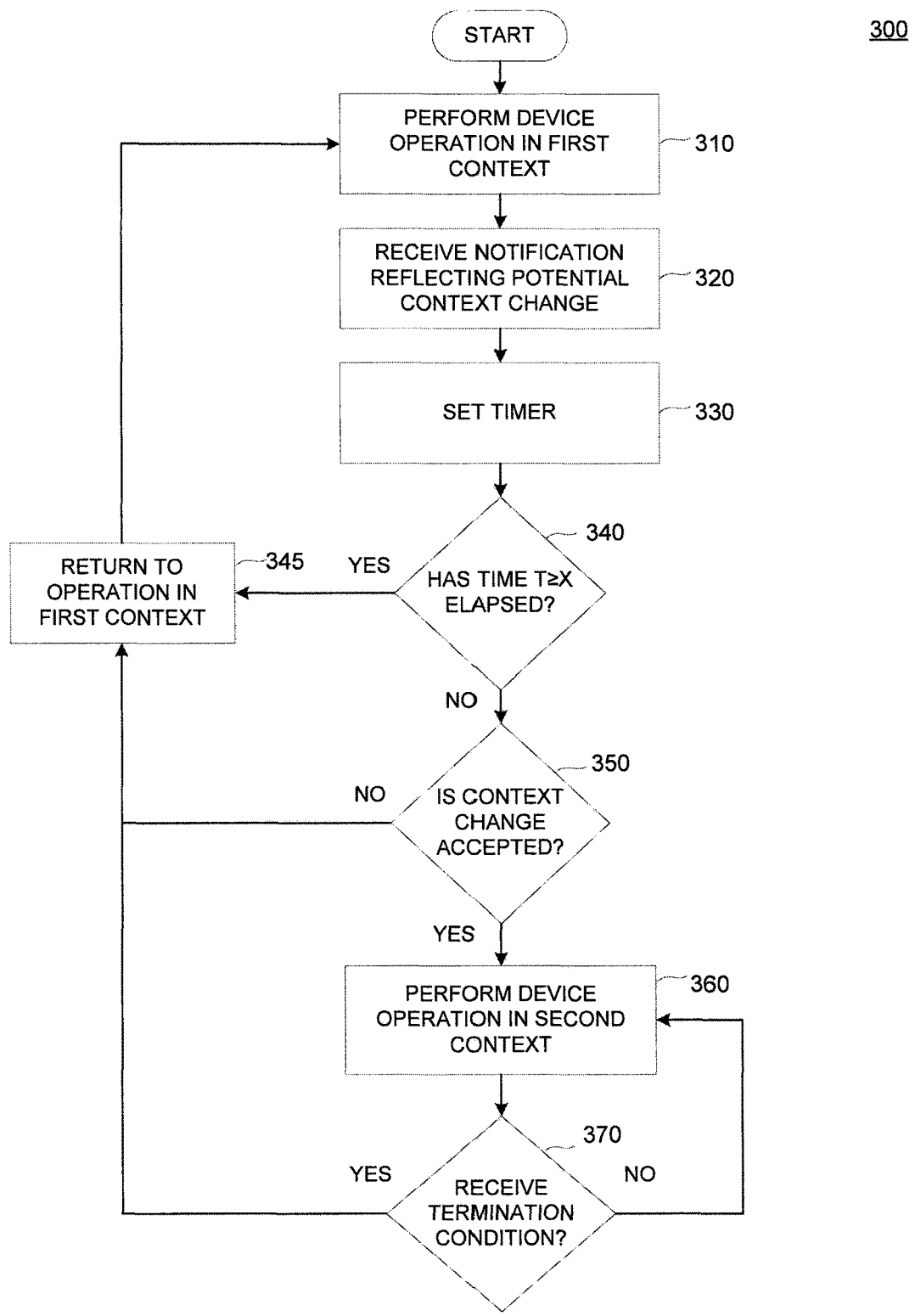
FIG. 3 is a flow chart showing an example device multitasking process, consistent with embodiments disclosed herein.

FIG. 3 is a flow chart showing a device multitasking process 300, consistent with example embodiments disclosed herein.

Electronic device 100 performs operations associated with a first context (Step 310). Processor 102 executes instructions stored in memory 110 to perform the operations. Display 112 of electronic device 100, via touchscreen 118 and viewing pane 230, outputs display of a graphical user interface associated with the first context. As illustrated in FIG. 2A, an example embodiment is a text window for composition of an email.

Electronic device 100, via communication subsystem 104 and network 150, receives a notification reflecting a potential change to a second operational context (Step 320). As illustrated in FIG. 2B, an example embodiment is a visual indicia, such as notification 240 on viewing pane 230 of touchscreen 118. In one embodiment, notification 240 may be accompanied by an audio notification to the user, through speakers 128. In another embodiment, auxiliary input/output unit 124 may cause electronic device 100 to vibrate to indicate to the user that a notification, such as notification 240, has been received.

After receiving the notification of Step 320, such as notification 240, processor 102 sets an internal timer (Step 330). Processor 102 determines a time X to allot for receiving acceptance of the context change by the user through keyboard 220 and/or touchscreen 118. Processor 102 determines, via the timer set in Step 330, whether a time greater than or equal to X has elapsed (Step 340). If a time greater than or equal to X has elapsed (Step 340: YES), then electronic device 100 returns to operating in the first operational context (Step 345). If a time greater than or equal to X has not elapsed (Step 340: NO), the process proceeds to Step 350.

Electronic device 100 determines whether or not the change in operational context is accepted by the user (Step 350). Electronic device 100 receives input indicating acceptance of the contextual change for example, via touchscreen 118, keyboard 220, or voice commands via microphone 130. In some embodiments, electronic device 100 may receive input indicating acceptance of the contextual change via a touch input on touchscreen 118 in the vicinity of notification 240. If the change in context is not accepted by the user (Step 350: NO), then electronic device 100 returns to operating in the first operational context (Step 345). In some embodiments, the contextual change can be denied through an input via keyboard 220 or touchscreen 118. If the contextual change is accepted (Step 350: YES), the process proceeds to Step 360.

Electronic device 100 performs operations associated with the second operational context (Step 360). Processor 102 executes instructions stored in memory 110 to perform the operations. Display 112 of electronic device 100, via touchscreen 118 and viewing pane 230, outputs display of a graphical user interface associated with the second context. As illustrated in FIGS. 2B-2C, an example embodiment is a window such as graphical user interface 245 to respond to an instant message or SMS text message.

Electronic device 100 determines whether a termination condition is received to terminate the second operational context (Step 370). The termination condition may comprise a user input via keyboard 220 or touchscreen 118, or it may comprise expiration of a timer set by processor 102 reflecting a predetermined amount of time elapsing since the last operation in the second context. If electronic device 100 receives indication of a termination condition (Step 370: YES), then electronic device 100 returns to operating in the first operational context (Step 345). If no termination condition is received (Step 370: NO), then electronic device 100 continues to perform operations in the second operational context.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The terms "electronic device" and "data processing apparatus" encompass all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to a suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, non-transitory form, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIG. 3) can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for operating an electronic device having a display and a capacitive physical keyboard, comprising:
    controlling operation of the device in a first application, wherein the device is configured to operate in the first application responsive to a first input operation of the capacitive physical keyboard that reflects selection of keys on the capacitive physical keyboard;
    responsive to receipt of information reflecting a potential application change, enabling control of the device to switch from operation in the first application responsive to the first input operation to operation in a second application that is different from the first application, wherein the device is configured to operate in the second application responsive to a second input operation of the capacitive physical keyboard that reflects selection of keys on the capacitive physical keyboard;
    while controlling operation of the device in the first application responsive to the first input operation, responsive to an input according to the second input operation of the capacitive physical keyboard that reflects selection of keys on the capacitive physical keyboard, controlling operation of the device in the second application responsive to the second input operation, wherein the first input operation comprises one or more presses of the keys on the capacitive physical keyboard, the second input operation comprises one or more taps of the keys on the capacitive physical keyboard, pressing a key engages a physical electronic dome switch associated with the pressed key, and tapping touches a tapped key without engaging a physical electronic dome switch associated with the tapped key; and
    returning control to operation in the first application.

2. The method of claim 1, wherein returning control to operation in the first application comprises:
- determining whether a timer has expired; and
- returning control to operation in the first application upon expiration of the timer.

3. The method of claim 1, wherein returning control to operation in the first application comprises:
- receiving a predetermined input according to the first input operation of the capacitive physical keyboard; and
- returning control to operation in the first application following receipt of the predetermined input.

4. The method of claim 1, further comprising:
- determining whether a timer has expired; and
- upon expiration of the timer, continuing operation of the device in the first application without switching to operation in the second application.

5. An electronic device having a display and a capacitive physical keyboard, comprising:
- a memory containing instructions; and
- one or more processors configured to execute the instructions to perform:
  - controlling operation of the device in a first application, wherein the device is configured to operate in the first application responsive to a first input operation of the capacitive physical keyboard that reflects selection of keys on the capacitive physical keyboard;
  - responsive to receipt of information reflecting a potential application change, enabling control of the device to switch from operation in the first application responsive to the first input operation to operation in a second application that is different from the first application, wherein the device is configured to operate in the second application responsive to a second input operation of the capacitive physical keyboard that reflects selection of keys on the capacitive physical keyboard;
  - while controlling operation of the device in the first application responsive to the first input operation, responsive to an input according to the second input operation of the capacitive physical keyboard that reflects selection of keys on the capacitive physical keyboard, controlling operation of the device in the second application responsive to the second input operation, wherein the first input operation comprises one or more presses of the keys on the capacitive physical keyboard, the second input operation comprises one or more taps of the keys on the capacitive physical keyboard, pressing a key engages a physical electronic dome switch associated with the pressed key, and tapping touches a tapped key without engaging a physical electronic dome switch associated with the tapped key; and
  - returning control to operation in the first application.

6. The electronic device of claim 5, wherein returning control to operation in the first application comprises:
- determining whether a timer has expired; and
- returning control to operation in the first application upon expiration of the timer.

7. The electronic device of claim 5, wherein returning control to operation in the first application comprises:
- receiving a predetermined input according to the first application while the second application is associated with a different input; and
- returning control to operation in the first application following receipt of the predetermined input.

8. The electronic device of claim 5, wherein the processor is configured to execute the instructions to further perform:
- determining whether a timer has expired; and
- upon expiration of the timer, continuing operation of the device in the first application without switching to operation in the second application.

9. The method of claim 1, wherein controlling operation of the device in the second application comprises displaying the second application on top of at least a portion of the first application while the first application remains open and visible in a background.

10. The method of claim 9, wherein displaying the second application on top of at least a portion of the first application while the first application remains open and visible in a background comprises displaying the second application on top of at least the portion of the first application and in focus while the first application remains open and visible in the background with a lower degree of clarity than the second application.

11. The electronic device of claim 5, wherein controlling operation of the device in the second application comprises displaying the second application on top of at least a portion of the first application while the first application remains open and visible in a background.

12. The electronic device of claim 11, wherein displaying the second application on top of at least a portion of the first application while the first application remains open and visible in a background comprises displaying the second application on top of at least the portion of the first application and in focus while the first application remains open and visible in the background with a lower degree of clarity than the second application.

13. A method for operating an electronic device having a display and a capacitive physical keyboard, comprising:
- controlling operation of the device in a first application, wherein the device is configured to operate in the first application responsive to a first input operation of the capacitive physical keyboard that reflects selection of keys on the capacitive physical keyboard;
- responsive to receipt of information reflecting a potential application change, enabling control of the device to switch from operation in the first application responsive to the first input operation to operation in a second application that is different from the first application, wherein the device is configured to operate in the second application responsive to a second input operation of the capacitive physical keyboard that reflects selection of keys on the capacitive physical keyboard;
- while controlling operation of the device in the first application responsive to the first input operation, responsive to an input according to the second input operation of the capacitive physical keyboard that reflects selection of keys on the capacitive physical keyboard, controlling operation of the device in the second application responsive to the second input operation, wherein the first input operation comprises one or more taps of the keys on the capacitive physical keyboard, the second input operation comprises one or more presses of the keys on the capacitive physical keyboard, pressing a key engages a physical electronic dome switch associated with the pressed key, and tapping touches a tapped key without engaging a physical electronic dome switch associated with the tapped key; and
- returning control to operation in the first application.

* * * * *